(12) United States Patent
Shono et al.

(10) Patent No.: US 10,566,863 B2
(45) Date of Patent: Feb. 18, 2020

(54) ROTOR FOR ROTARY ELECTRIC MACHINE, ROTARY ELECTRIC MACHINE PROVIDED WITH SAME, AND METHOD FOR MANUFACTURING ROTOR FOR ROTARY ELECTRIC MACHINE

(71) Applicant: MITSUBISHI ELECTRIC CORPORATION, Chiyoda-ku, Tokyo (JP)

(72) Inventors: Kazuhiro Shono, Tokyo (JP); Yuki Tamura, Tokyo (JP); Ryohei Uno, Tokyo (JP); Koji Masumoto, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 137 days.

(21) Appl. No.: 15/751,932

(22) PCT Filed: Oct. 3, 2016

(86) PCT No.: PCT/JP2016/079263
§ 371 (c)(1),
(2) Date: Feb. 12, 2018

(87) PCT Pub. No.: WO2017/061365
PCT Pub. Date: Apr. 13, 2017

(65) Prior Publication Data
US 2018/0241264 A1     Aug. 23, 2018

(30) Foreign Application Priority Data
Oct. 6, 2015 (JP) ................. 2015-198140

(51) Int. Cl.
*H02K 1/27* (2006.01)
*H02K 1/32* (2006.01)
*H02K 15/03* (2006.01)

(52) U.S. Cl.
CPC ............. *H02K 1/2766* (2013.01); *H02K 1/32* (2013.01); *H02K 15/03* (2013.01)

(58) Field of Classification Search
CPC ........ H02K 1/2766; H02K 1/276; H02K 1/28; H02K 1/32; H02K 1/22; H02K 15/03
(Continued)

(56) References Cited

U.S. PATENT DOCUMENTS

2015/0061427 A1* 3/2015 Vartiainen ............ H02K 1/2773
                                                                310/59
2015/0244244 A1   8/2015 Izumi
2016/0285326 A1*  9/2016 Kawamura ............ H02K 1/276

FOREIGN PATENT DOCUMENTS

EP   2 660 955 A1    11/2013
JP   2008-271622 A   11/2008
(Continued)

OTHER PUBLICATIONS

Machine translation of JP-2014007939-A. (Year: 2014).*
(Continued)

*Primary Examiner* — Michael Andrews
(74) *Attorney, Agent, or Firm* — Buchanan Ingersoll & Rooney PC

(57) ABSTRACT

A rotor core in which magnets are embedded is formed by stacking a plurality of steel sheets. Each steel sheet which has a disk shape has: six magnet insertion holes formed so as to allow permanent magnets to be inserted therein as a whole; circumferential-direction bridge portions connecting, in the circumferential direction, radially-outer-side steel sheets each formed at the peripheral part of the steel sheet, (Continued)

between the magnet insertion holes; and radial-direction bridge portions formed between the magnet insertion holes. The circumferential-direction bridge portions and the radial-direction bridge portions have coined portions having decreased sheet thicknesses and protruding in an arc shape in the sheet-thickness direction. The coined portions having decreased sheet thicknesses suppress short-circuit of a magnetic flux between magnetic poles, and formation of the arc shapes absorbs extension of these portions caused by a coining work, to suppress deformation of the steel sheet.

20 Claims, 16 Drawing Sheets

(58) Field of Classification Search
USPC ... 310/61, 156.57, 156.53, 216.048, 216.054
See application file for complete search history.

(56) References Cited

FOREIGN PATENT DOCUMENTS

| JP | 2010-207021 A | 9/2010 |
|---|---|---|
| JP | 2013-042596 A | 2/2013 |
| JP | 2014-007939 A | 1/2014 |
| JP | 2014007939 A * | 1/2014 |
| JP | 2015-516135 A | 6/2015 |
| JP | 2015-173582 A | 10/2015 |
| JP | 2016-86518 A | 5/2016 |
| WO | WO 2013/164298 A1 | 11/2013 |
| WO | 2014/156090 A1 | 10/2014 |

OTHER PUBLICATIONS

Office Action dated May 28, 2019, by the Chinese Patent Office in corresponding Chinese Patent Application No. 201680057241.7 and English translation of the Office Action. (18 pages).

International Search Report (PCT/ISA/210) dated Dec. 13, 2016, by the Japanese Patent Office as the International Searching Authority for International Application No. PCT/JP2016/079263.

Written Opinion (PCT/ISA/237) dated Dec. 13, 2016, by the Japanese Patent Office as the International Searching Authority for International Application No. PCT/JP2016/079263.

Office Action (Notification of Reasons for Refusal) dated Jul. 10, 2018, by the Japanese Patent Office in corresponding Japanese Patent Application No. 2017-544482 and English translation of the Office Action. (6 pages).

* cited by examiner

ROTOR FOR ROTARY ELECTRIC MACHINE, ROTARY ELECTRIC MACHINE PROVIDED WITH SAME, AND METHOD FOR MANUFACTURING ROTOR FOR ROTARY ELECTRIC MACHINE

TECHNICAL FIELD

The present invention relates to improvement in a rotor for a rotary electric machine provided to, for example, an air-conditioner compressor, and the rotary electric machine having the rotor.

BACKGROUND ART

In a rotary electric machine using permanent magnets for a rotor, in particular, in a high-characteristics rotary electric machine using rare earth sintered magnets, the magnets have a high proportion of the motor cost and therefore the magnetic flux of the magnets is required to be effectively utilized. Here, an interior magnet rotor has advantages that, for example, the usage amount of magnets is small and the rotor can withstand high-speed rotation, as compared to a surface magnet rotor. Therefore, such interior magnet rotors are applied to many products. However, the interior magnet rotor has a disadvantage that magnetic flux short-circuit occurs at a bridge portion as a boundary between magnetic poles. Accordingly, as a structure for suppressing the magnetic flux short-circuit, it is proposed that a coining work is performed so as to decrease the sheet thickness of a bridge portion of a steel sheet for core. In the coining work, for example, by a punch and a die, the steel sheet is worked so as to decrease the sheet thickness thereof, whereby a coined portion is formed.

Further, the following is proposed. A plurality of embedding holes as magnet insertion holes are provided to which permanent magnets are mounted, and magnetic path narrowed portions as bridges are provided between the embedding holes and the peripheral part of an electromagnetic steel sheet (steel sheet of rotor). Electromagnetic steel sheets are stamped plural times to form the magnetic path narrowed portions and the plurality of embedding holes. At the same time as the plural stamping works, the magnetic path narrowed portions are subjected to a pressure so as to be squeezed, whereby the sheet thicknesses of these portions are decreased. Thus, the magnetic characteristics of the magnetic path narrowed portions are deteriorated, whereby a magnetic flux short-circuited via each magnetic path narrowed portion is reduced and a magnetic flux that works effectively is increased (see, for example, Patent Document 1).

CITATION LIST

Patent Document

Patent Document 1: Japanese Laid-Open Patent Publication No. 2013-042596 (paragraphs [0011]-[0027] of the specification, and FIGS. 1-7)

SUMMARY OF THE INVENTION

Problems to be Solved by the Invention

However, in the above conventional example, since the sheet thickness is decreased by a pressure being applied to the magnetic path narrowed portion, the squeezed part extends and thus deformation occurs. For example, when the magnetic path narrowed portion provided between the embedding hole and the peripheral part of the electromagnetic steel sheet is pressed to be squeezed, the magnetic path narrowed portion further extends in the radial direction, and therefore the electromagnetic steel sheet extends outward in the radial direction. As a result, the outer diameter of the rotor formed by stacking the electromagnetic steel sheets increases, and thus might deviate from a specified dimensional tolerance. If the external dimension deviates from the specified dimensional tolerance and becomes great, pulsation of a magnetic flux at an air gap increases. Thus, iron loss increases, and vibration and noise increase, resulting in a problem that the characteristics of the rotary electric machine are deteriorated. Other than the magnetic path narrowed portions, for example, if the steel sheet is coined to form a thinned portion for the purpose of forming a cooling medium passage, the periphery of the thinned portion extends also in the radial direction, and similarly, the electromagnetic steel sheet extends outward in the radial direction. As a result, the outer diameter of the rotor formed by stacking the electromagnetic steel sheets increases, and thus might deviate from the specified dimensional tolerance.

The present invention has been made to solve the above problems, and an object of the present invention is to obtain a rotor for rotary electric machine that has high dimensional accuracy and excellent magnetic characteristics, and a rotary electric machine having high performance.

Solution to the Problems

A rotor for rotary electric machine according to the present invention is a rotor of an embedded-magnet type in which a magnet is included inside a stacked core formed by stacking a plurality of stacked steel sheets, each steel sheet having: a radially-outer-side steel sheet positioned on a radially outer side of the magnet; a radially-inner-side steel sheet positioned on a radially inner side of the magnet; and a plurality of bridges connecting the radially-outer-side steel sheet and the radially-inner-side steel sheet, wherein a coined portion shaped to decrease a sheet thickness thereof is formed at a part of each steel sheet, and a bent portion shaped so as to protrude in an axial direction of the rotor is formed at a part of each bridge.

A rotary electric machine according to the present invention includes the rotor described above.

Effect of the Invention

In the rotor for rotary electric machine according to the present invention, each steel sheet having the coined portions and the bent portions allows deformation caused by formation of the coined portions to be absorbed by the bent portions, or allows deformation caused by formation of the coined portions to be corrected by a bending work on the bent portions. Therefore, dimensional accuracy of the steel sheet can be ensured, and if the rotor is formed by stacking such steel sheets, it is possible to obtain a rotor for rotary electric machine having high dimensional accuracy and excellent magnetic characteristics.

In addition, since the rotary electric machine according to the present invention includes the rotor described above, a rotary electric machine having high performance can be obtained.

DESCRIPTION OF EMBODIMENTS

Embodiment 1

Figure 1:
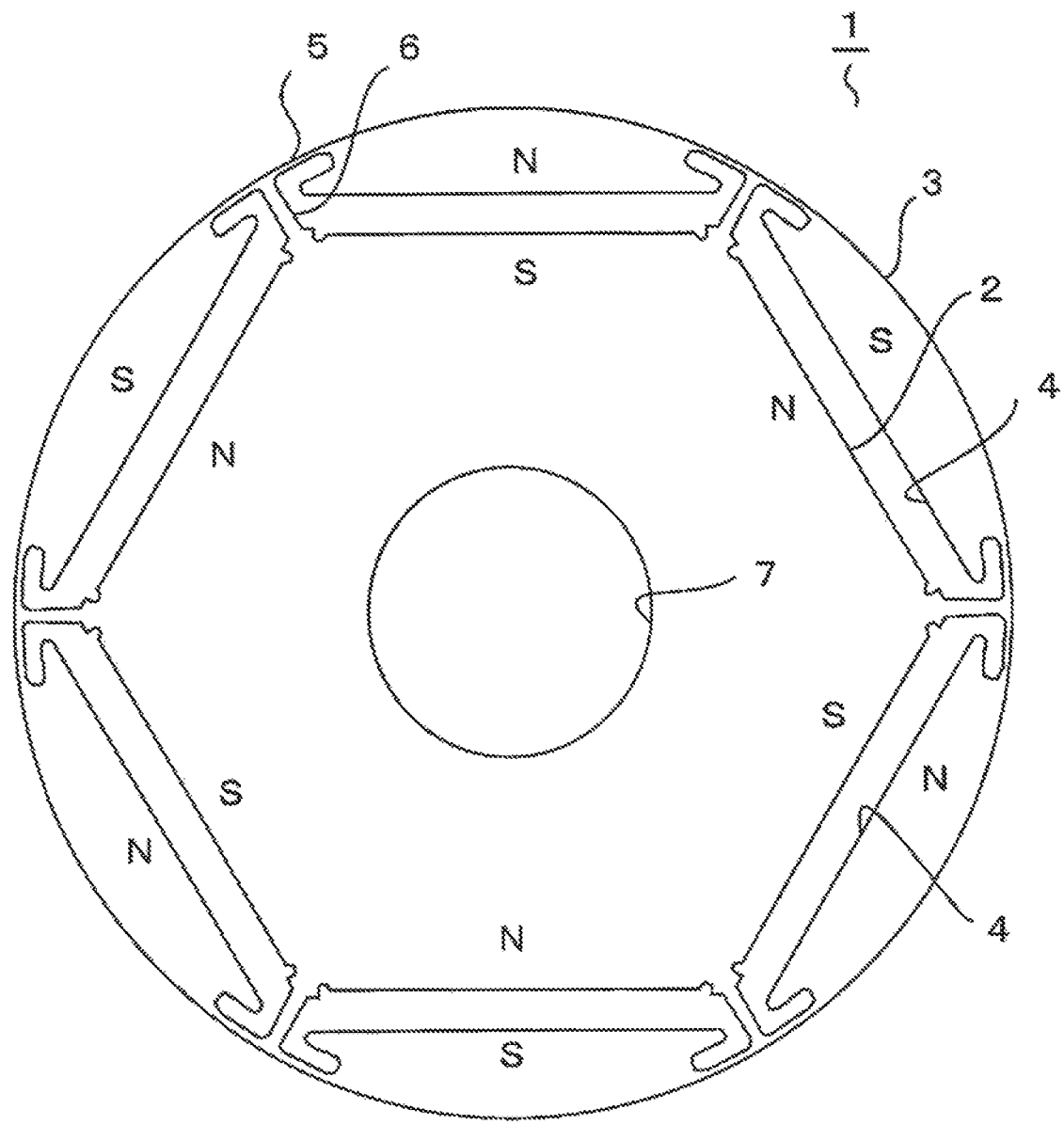
FIG. 1 is a plan view showing a steel sheet for core of a rotor according to embodiment 1 of the present invention.
Figure 2:
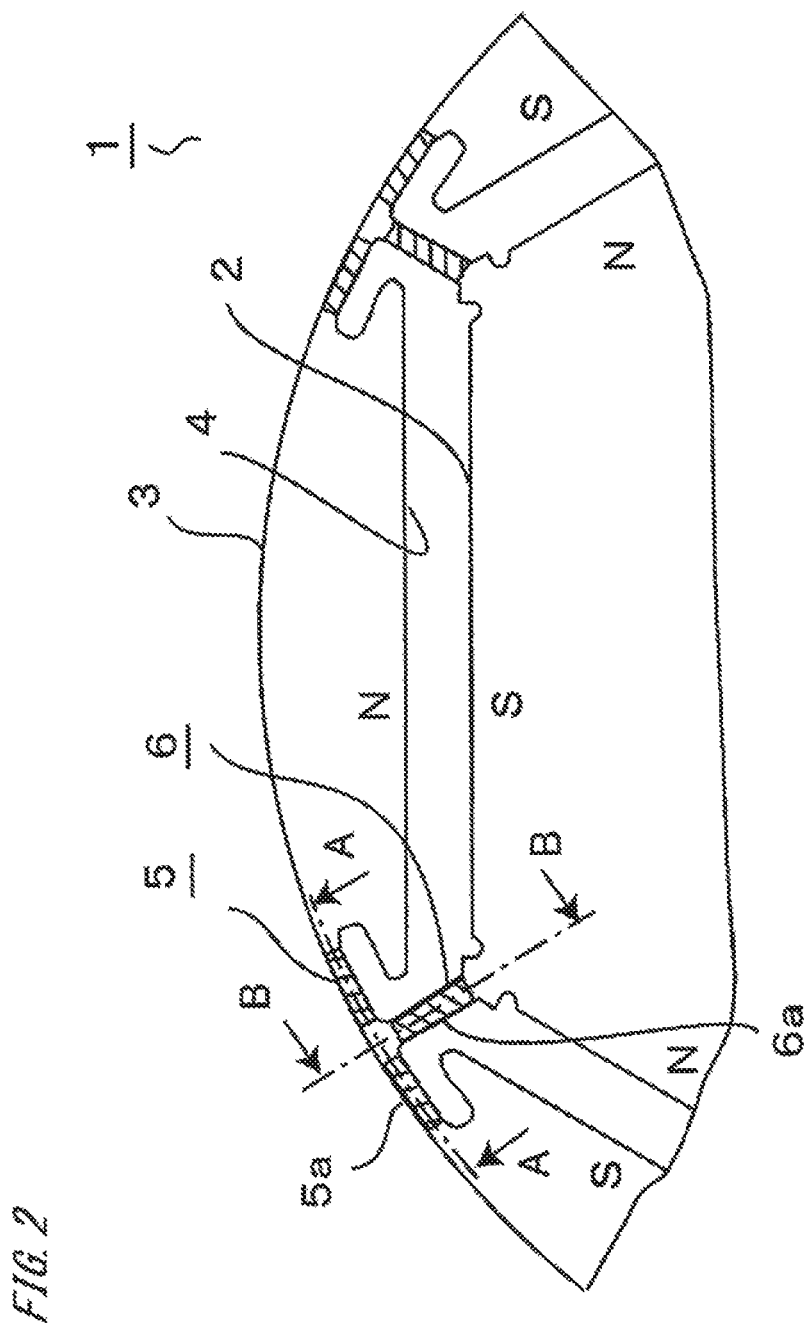
FIG. 2 is a plan view showing a major part of the steel sheet shown in FIG. 1.
Figure 3:
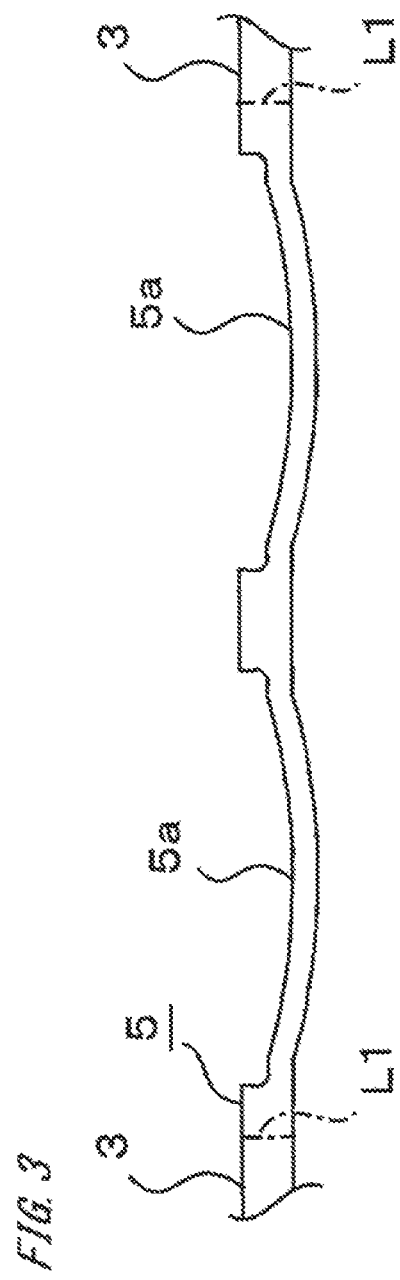
FIG. 3 is a sectional view of a circumferential-direction bridge portion of the steel sheet shown in FIG. 2, as seen from A-A arrow direction.
Figure 4:
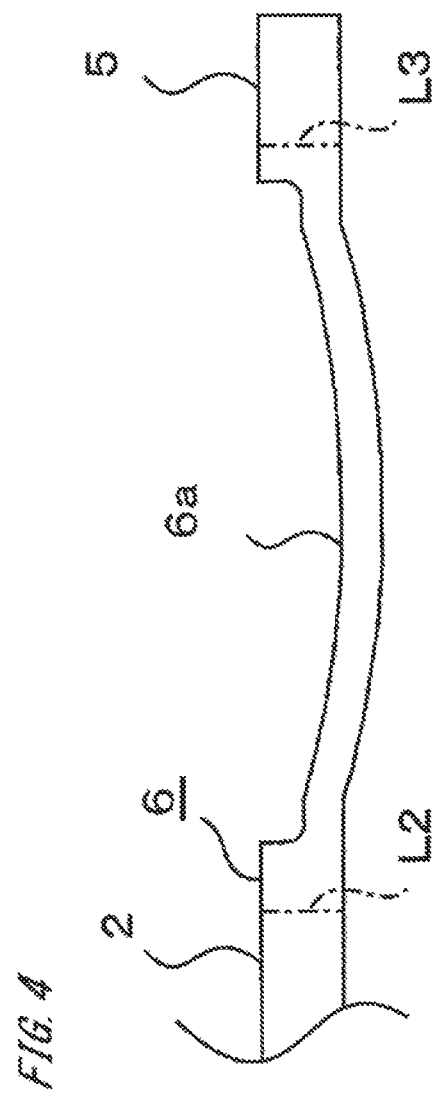
FIG. 4 is a sectional view of a radial-direction bridge portion of the steel sheet shown in FIG. 2, as seen from B-B arrow direction.
Figure 5:
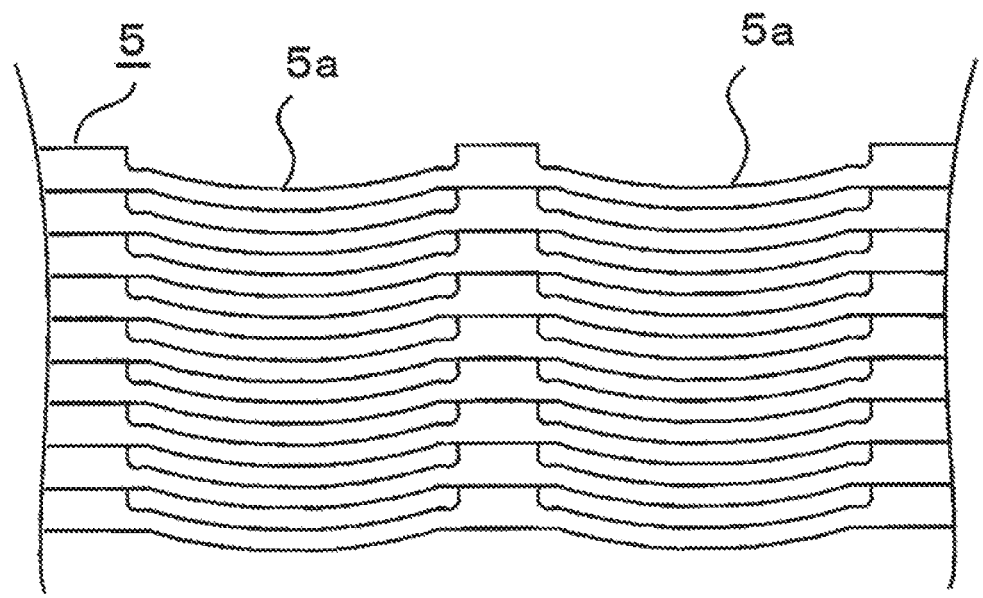
FIG. 5 is a sectional view of the circumferential-direction bridge portions when the steel sheets shown in FIG. 2 are stacked.
Figure 6:
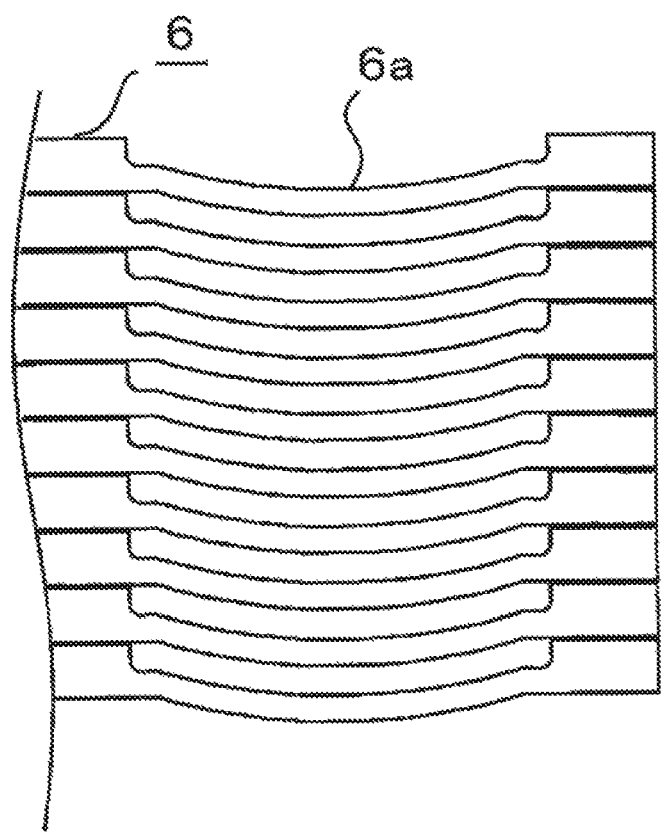
FIG. 6 is a sectional view of the radial-direction bridge portions when the steel sheets shown in FIG. 2 are stacked.
Figure 7:
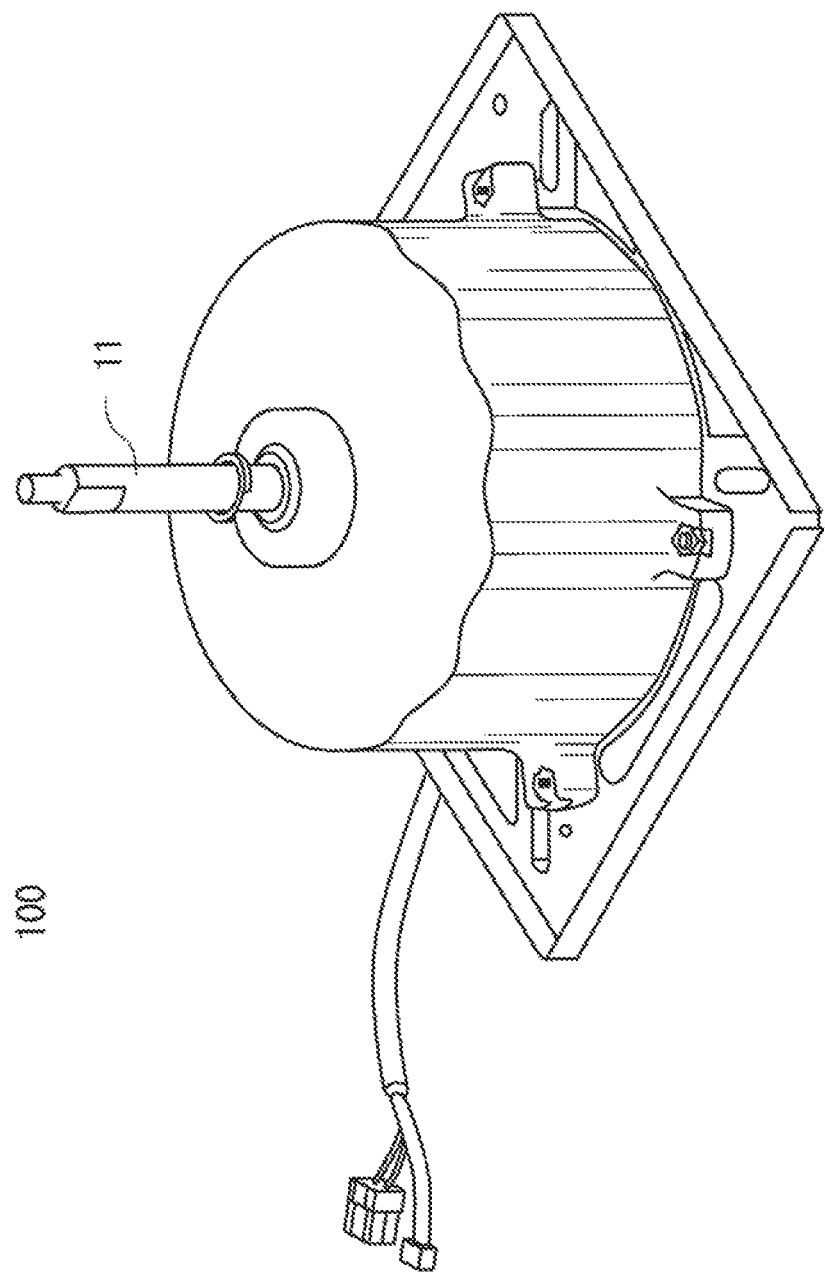
FIG. 7 is a perspective view showing the outer appearance of an entire rotary electric machine including the rotor according to embodiment 1.

FIG. 1 to FIG. 7 show embodiment 1 for carrying out the present invention. FIG. 1 is a plan view showing a steel sheet of a rotor. FIG. 2 is a plan view showing a major part of the steel sheet shown in FIG. 1. FIG. 3 is a sectional view of a circumferential-direction bridge portion of the steel sheet shown in FIG. 2, as seen from A-A arrow direction. FIG. 4 is a sectional view of a radial-direction bridge portion of the steel sheet shown in FIG. 2, as seen from B-B arrow direction. FIG. 5 is a sectional view of the circumferential-direction bridge portions when the steel sheets shown in FIG. 2 are stacked. FIG. 6 is a sectional view of the radial-direction bridge portions when the steel sheets shown in FIG. 2 are stacked. FIG. 7 is a perspective view showing the outer appearance of an entire rotary electric machine.

The rotary electric machine 100 shown in FIG. 7 is configured as, for example, an inner-rotor-type rotary electric machine, and inside the rotary electric machine 100, has a cylindrical stator and a rotor which is located inside the stator and rotates about a shaft 11 as an axis. A core of the rotor is formed by stacking disk-shaped steel sheets 1.

As shown in FIG. 1, the disk-shaped steel sheet 1 has magnet insertion holes 4 and shaft insertion holes 7. As the steel sheet 1, a steel sheet obtained by stamping a thin sheet such as an electromagnetic steel strip in a disk shape by a press work is often used.

A plurality of the steel sheets 1 are stacked to form the core of the rotor, and plate-like rare earth sintered magnets as permanent magnets are inserted into the magnet insertion holes 4, whereby N poles and S poles are formed (six poles in total). In addition, the shaft 11 is inserted into the shaft insertion hole 7, whereby the rotor is formed.

In addition, when the magnet insertion holes 4 are formed in the steel sheet 1, circumferential-direction bridge portions 5 and radial-direction bridge portions 6 as bridges are formed. Each circumferential-direction bridge portion 5 is formed, between the magnet insertion holes 4, at the peripheral part of the steel sheet 1 on the outer circumferential side with respect to the magnet insertion holes 4. The sheet thickness of the circumferential-direction bridge portion 5 is the same as that of the steel sheet 1. Each radial-direction bridge portion 6 is formed in an elongated thin shape in the radial direction between the magnet insertion holes 4. The sheet thickness of the radial-direction bridge portion 6 is the same as that of the steel sheet 1.

Thus, the steel sheet 1 is separated by the magnet insertion holes 4 into a radially-inner-side steel sheet 2 having a hexagonal shape and six radially-outer-side steel sheets 3 having nail-crescentic shapes, and the radially-inner-side steel sheet 2 and the radially-outer-side steel sheets 3 are mechanically connected via the circumferential-direction bridge portions 5 and the radial-direction bridge portions 6. Each circumferential-direction bridge portion 5 and each radial-direction bridge portion 6 integrally form a T shape. Each circumferential-direction bridge portion 5 connects the radially-outer-side steel sheets 3 in the circumferential direction. Each radial-direction bridge portion 6 is present between the magnet insertion holes 4 so as to separate the magnet insertion holes 4 in the circumferential direction.

As shown in FIG. 2, each circumferential-direction bridge portion 5 and each radial-direction bridge portion 6 respectively have coined portions 5a, 6a (shown by hatching) as thinned portions and bent portions. The coined portions 5a, 6a are formed by thinning the sheet thicknesses of the circumferential-direction bridge portion 5 and the radial-direction bridge portion 6 by a coining work as a press work, that is, the sheet thicknesses of the coined portions 5a, 6a are decreased. Further, as shown in FIG. 3 and FIG. 4, the coined portions 5a, 6a form bent portions by being shaped so as to bulge in an arc shape in the sheet-thickness direction of the steel sheet 1, i.e., the sheet-thickness direction of the circumferential-direction bridge portion 5 and the radial-direction bridge portion 6 (hereinafter, simply referred to as sheet-thickness direction). The working depths of the coined portions 5a, 6a are set such that the coined portions 5a, 6a are recessed by an amount corresponding to about half the sheet thickness of the steel sheet 1 from the surfaces of the circumferential-direction bridge portion 5 and the radial-direction bridge portion 6. It is noted that, in FIG. 3 and FIG. 4, the circumferential-direction bridge portion 5, the radial-direction bridge portion 6, and the coined portions 5a, 6a are worked such that parts of the circumferential-direction bridge portion 5 and the radial-direction bridge portion 6 other than the coined portions 5a, 6a are not deformed in the sheet-thickness direction and thus have flat shapes on both surfaces. It is noted that, in the sectional views in FIG. 3, FIG. 4, etc., for facilitating the understanding, the boundary between the radially-outer-side steel sheet 3 and the circumferential-direction bridge portion 5 is indicated by virtual line L1, the boundary between the radial-direction bridge portion 6 and the radially-inner-side steel sheet 2 is indicated by virtual line L2, and the boundary between the radial-direction bridge portion 6 and the circumferential-direction bridge portion 5 is indicated by virtual line L3.

In the working, the surfaces of the steel sheet 1 other than parts to be worked are held and pressed from both sides to perform the work so that parts other than the parts to be worked are not deformed. Thus, when the steel sheets 1 are stacked to manufacture the core, the core does not become a deformed product, the stacking is facilitated, and dimensional accuracy of the core is also ensured. In the case where such steel sheets 1 are stacked to form the core, FIG. 5 shows a sectional view of the coined portions 5a of the circumferential-direction bridge portions 5 as seen from A-A arrow direction, and FIG. 6 shows a sectional view of the coined portions 6a of the radial-direction bridge portions 6 as seen from B-B arrow direction. As shown in these drawings, the coined portions 5a, 6a protrude downward with respect to the lower level of the steel sheet 1 but fall into the adjacent coined portions 5a, 6a. Thus, the stacked steel sheets 1 do not interfere with each other and the steel sheets 1 can be stacked in a flat manner.

The ranges where the coined portions 5a, 6a are provided are set to be almost the same as or slightly shorter than the lengths of the circumferential-direction bridge portion 5 and the radial-direction bridge portion 6, respectively, and more preferably, it is desirable that the coined portions 5a, 6a are provided within such a range that rounded parts of both end edges of the coined portions 5a, 6a do not reach the boundaries (ends) (virtual lines L1, L2, L3 (see FIG. 3, FIG. 4)) of the circumferential-direction bridge portion 5 and the radial-direction bridge portion 6, respectively. In addition, if stress that occurs on the circumferential-direction bridge portion 5 and the radial-direction bridge portion 6 during operation of the rotary electric machine 100 is taken into consideration, for the purpose of avoiding stress concentration due to cutout effect, it is desirable that the coined portions 5a, 6a are formed avoiding, in particular, the vicinity of the connection part (intersection of T) where the circumferential-direction bridge portion 5 is connected to the radial-direction bridge portion 6, i.e., the coined portions 5a, 6a are formed at locations away from the connection part to a certain extent (see FIG. 2).

Further, if the coining work step for forming the coined portions 5a, 6a and the shaping step for forming the bent portions by shaping these portions into arc shapes in the sheet-thickness direction are performed at the same time at the same station of the press, the size of the press die can be reduced. On the other hand, if these works are separately performed at different stations, the depth in the coining work and the magnitude (degree of protrusion) in the arc shaping work (bending work) can be set individually, and thus the adjustments thereof become easy, and further, adjustment of the external-dimension accuracy of the steel sheet 1 becomes easy.

Either the coining work step or the shaping step may be performed first, or both steps may be performed at the same time. In the case of performing the coining work step and the shaping step at the same time, when the coined portions 5a, 6a are formed in the circumferential-direction bridge portion 5 and the radial-direction bridge portion 6, the circumferential-direction bridge portion 5 is to extend in the circumferential direction and the radial-direction bridge portion 6 is to extend in the radial direction. However, the bent portions are formed by causing the circumferential-direction bridge portion 5 and the radial-direction bridge portion 6 to bulge in arc shapes protruding in the sheet-thickness direction so as to allow deformation in the circumferential direction or the radial direction of the steel sheet 1. Thus, the extensions of the circumferential-direction bridge portion 5 and the radial-direction bridge portion 6 caused by the coining work are respectively absorbed, and therefore increase in the external dimension of the steel sheet 1 can be suppressed. As a result, error in the external dimension of the steel sheet 1 can be kept so as to satisfy the designing value.

If the shaping step is performed after the coining work step, deformation of the steel sheet 1 caused by the coining work is corrected by the bending work, whereby increase in the external dimension of the steel sheet 1 can be suppressed. As a result, error in the external dimension of the steel sheet 1 can be kept so as to satisfy the designing value.

In the core of the rotor formed by stacking such steel sheets 1, by the coining work on each circumferential-direction bridge portion 5 and each radial-direction bridge portion 6, the sheet thicknesses of these parts are made smaller than the sheet thicknesses of the circumferential-direction bridge portion 5 and the radial-direction bridge portion 6, whereby the magnetic resistance is increased and bypassing of a magnetic flux can be suppressed. Thus, the rotor for the rotary electric machine 100 can be obtained so as to have high dimensional accuracy, excellent magnetic characteristics, and stable quality. In addition, the rotary electric machine 100 having such a rotor has excellent magnetic performance. Further, the above manufacturing method makes it possible to manufacture the rotor for the rotary electric machine 100 so as to have high dimensional accuracy, excellent magnetic characteristics, and stable quality.

Embodiment 2

Figure 8:
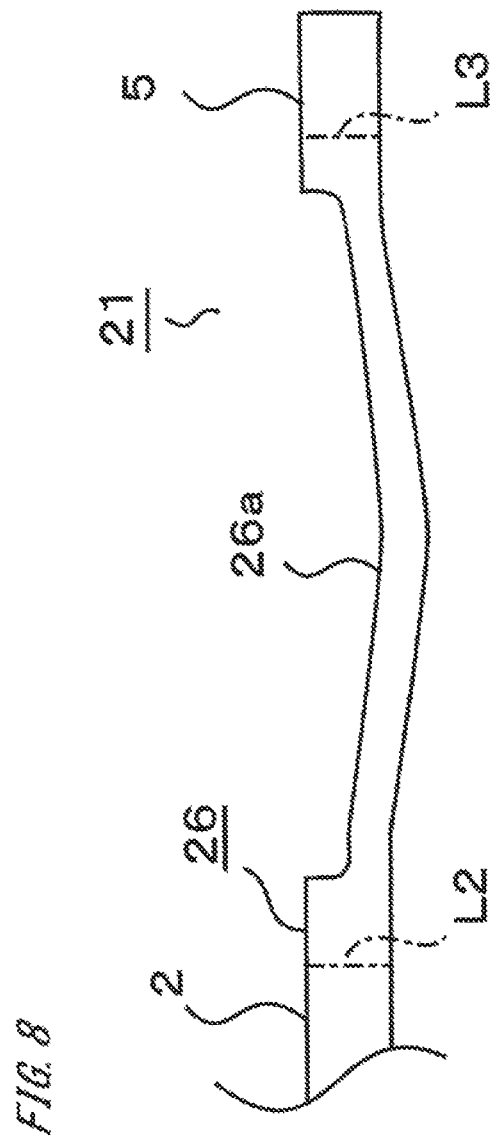
FIG. 8 is a sectional view of a radial-direction bridge portion of a steel sheet according to embodiment 2.

FIG. 8 is a sectional view of a radial-direction bridge portion of a steel sheet according to embodiment 2. In FIG. 8, a steel sheet 21 has a radial-direction bridge portion 26 as a bridge, and a coined portion 26a as a thinned portion and a bent portion which is provided in the radial-direction bridge portion 26 and which has a smaller sheet thickness than that of the radial-direction bridge portion 26. The coined portion 26a is formed to have a V-shaped sectional shape protruding in the sheet-thickness direction of the steel sheet 1 (radial-direction bridge portion 26). Although not shown, the same applies to the sectional shape of a coined portion of a circumferential-direction bridge portion. The radial-direction bridge portion 26 is provided at the same position as the radial-direction bridge portion 6 shown in FIG. 1. The other configuration is the same as that in embodiment 1 shown in FIG. 2, and therefore the description thereof is omitted.

By forming the rotor core using such steel sheets 21, it becomes possible to obtain a rotor for rotary electric machine that has high dimensional accuracy, excellent magnetic characteristics, and stable quality. In addition, it becomes easy to manufacture the die.

Embodiment 3

Figure 9:
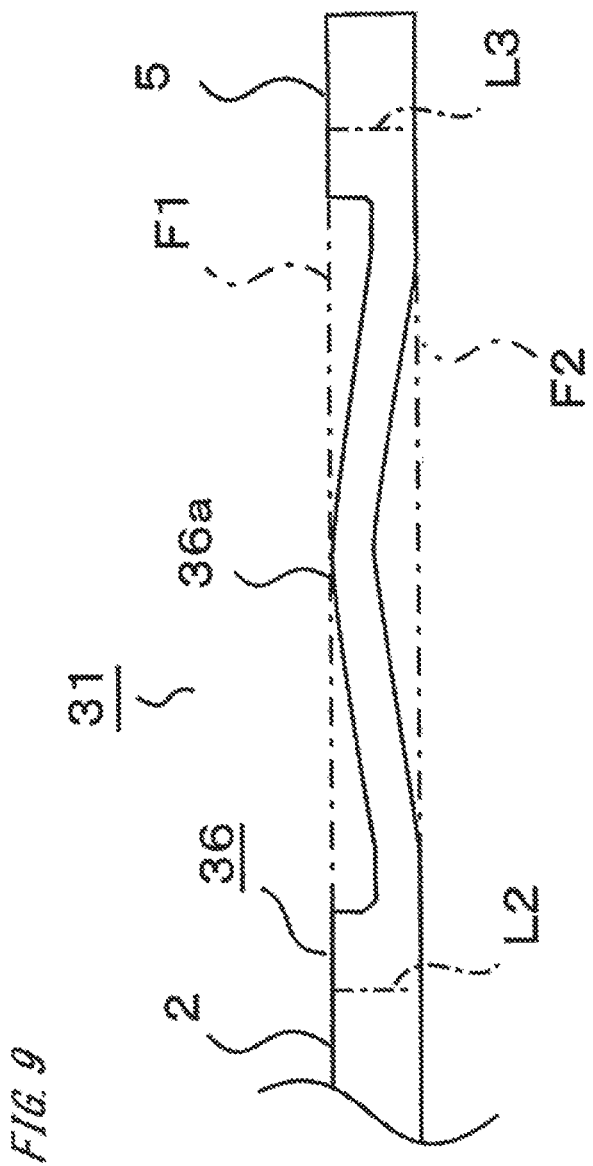
FIG. 9 is a sectional view of a radial-direction bridge portion of a steel sheet according to embodiment 3.

FIG. 9 is a sectional view of a radial-direction bridge portion of a steel sheet according to embodiment 3. In FIG. 9, a steel sheet 31 has a radial-direction bridge portion 36 as a bridge, and a coined portion 36a as a thinned portion and a bent portion which is formed by working the radial-direction bridge portion 36. The coined portion 36a is recessed downward from an upper level F1 of the radial-direction bridge portion 36 by a coining work and the bottom of the recessed part is formed so as to protrude upward (toward upper level F1), thus forming a V-shaped sectional shape. As shown in FIG. 9, the coined portion 36a having the V-shaped sectional shape is formed so as not to protrude from the upper level F1 and a lower level F2 (corresponding to the surfaces of the radially-inner-side steel sheet 2 and the radially-outer-side steel sheet 3), of the radial-direction bridge portion 36, which are not subjected to the working. In this case, the thickness of the steel sheet 31 including the coined portion 36a is the same as the thickness before the working, i.e., the thickness of the steel sheet 31 itself. Although not shown, the same applies to the sectional shape of the coined portion of a circumferential-direction bridge portion. The radial-direction bridge portion 36 is provided at the same position as the radial-direction bridge portion 6 shown in FIG. 1. The other configuration is the same as that in embodiment 1 shown in FIG. 2, and therefore the description thereof is omitted.

In the configuration as described above, the coined portion 36a of each radial-direction bridge portion 36 can be prevented from protruding from the surface of the steel sheet 1, whereby it becomes easy to convey the steel sheet 1 at the time of a press work. In addition, when the core is formed by stacking the steel sheets 1, the radial-direction bridge portions 36 and the circumferential-direction bridge portions can be prevented from protruding in the axial direction of the core, and thus the core can be easily handled.

In addition, by using such steel sheets 31, it becomes possible to obtain a rotor for rotary electric machine that has high dimensional accuracy, excellent magnetic characteristics, and stable quality.

Embodiment 4

Figure 10:
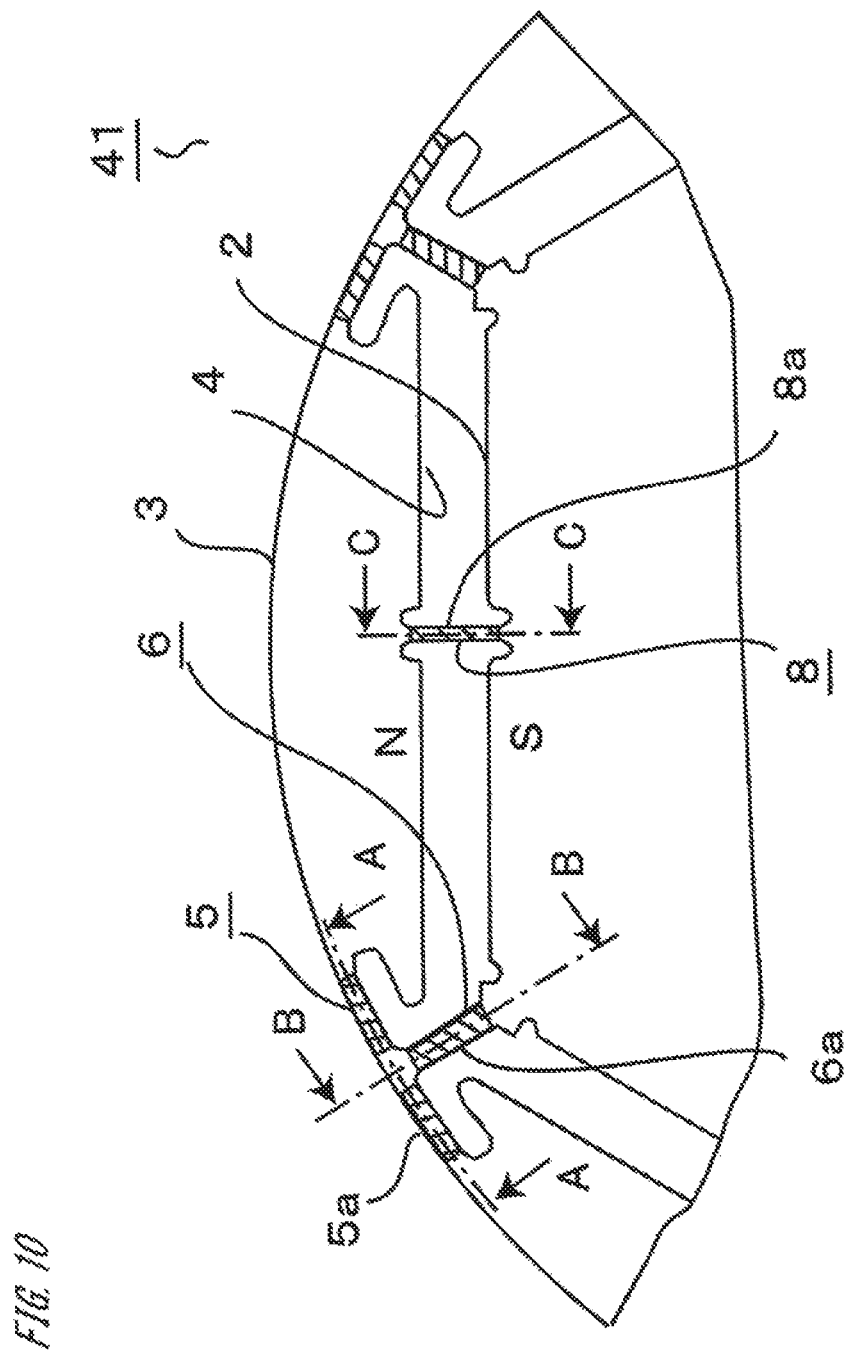
FIG. 10 is a plan view showing a major part of a steel sheet according to embodiment 4.
Figure 11:
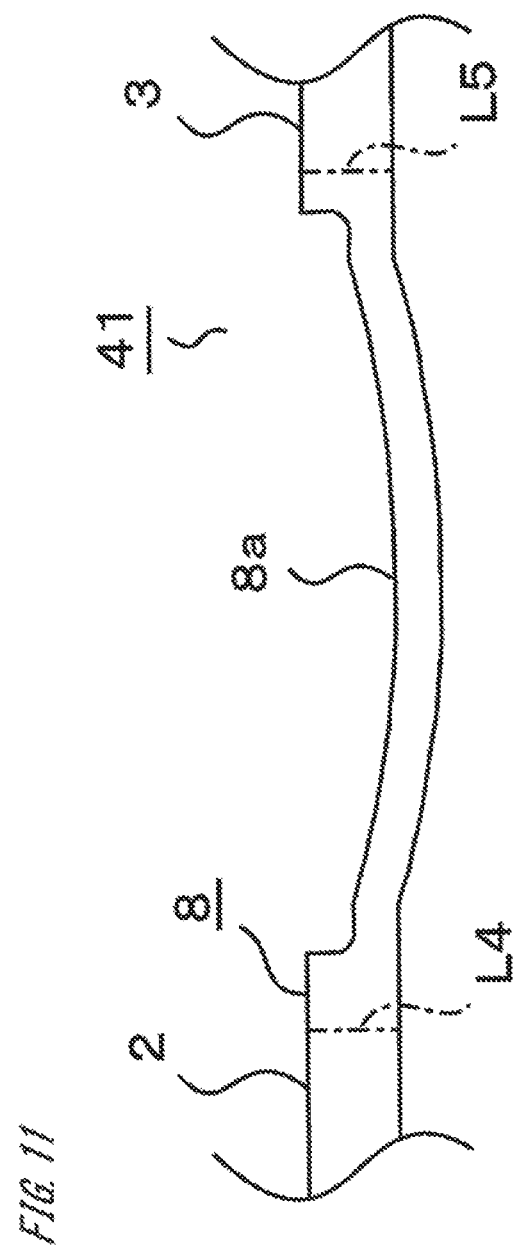
FIG. 11 is a sectional view of a center bridge portion of the steel sheet shown in FIG. 10, as seen from C-C arrow direction.

FIG. 10 and FIG. 11 show embodiment 4. FIG. 10 is a plan view showing a major part of a steel sheet. FIG. 11 is a sectional view of a center bridge portion of the steel sheet shown in FIG. 10, as seen from C-C arrow direction. In these drawings, a steel sheet 41 has a center bridge portion 8 as a bridge. The center bridge portion 8 connects a radially-inner-side steel sheet 2 and a radially-outer-side steel sheet 3 at the center of the magnet insertion hole 4. In addition, the center bridge portion 8 has a coined portion 8a (shown by hatching) as a thinned portion and a bent portion. As shown in FIG. 11, the coined portion 8a has a smaller sheet thickness than that of the center bridge portion 8 and the sectional shape of the coined portion 8a is formed in an arc shape in the sheet-thickness direction. It is noted that, in FIG. 11, the boundary between the radially-inner-side steel sheet 2 and the center bridge portion 8 is indicated by virtual line L4, and the boundary between the center bridge portion 8 and the radially-outer-side steel sheet 3 is indicated by virtual line L5. The other configuration is the same as that in embodiment 1 shown in FIG. 2. Therefore, the corresponding parts are denoted by the same reference characters and the description thereof is omitted.

In the configuration as described above, when the coined portion 8a is formed in the center bridge portion 8, each bridge portion is to extend, but since the coined portion 8a is formed to have an arc shape, the extension is absorbed and thus deformation such as expansion of the outer shape of the steel sheet 1 can be suppressed. As a result, while magnetic short-circuit at the center bridge portion 8 is suppressed, accuracy of the external dimension of the core of the rotor is ensured, whereby a rotor having high accuracy is obtained and the magnetic characteristics of the rotary electric machine can be improved. In addition, since the center parts of the magnet insertion hole 4 are connected by the center bridge portion 8 having the coined portion 8a, the mechanical strength of the steel sheet 41 can be improved while magnetic flux short-circuit is prevented.

In addition, by using such steel sheets 41, it becomes possible to obtain a rotor for rotary electric machine that has high dimensional accuracy, excellent magnetic characteristics, and stable quality.

Embodiment 5

Figure 12:
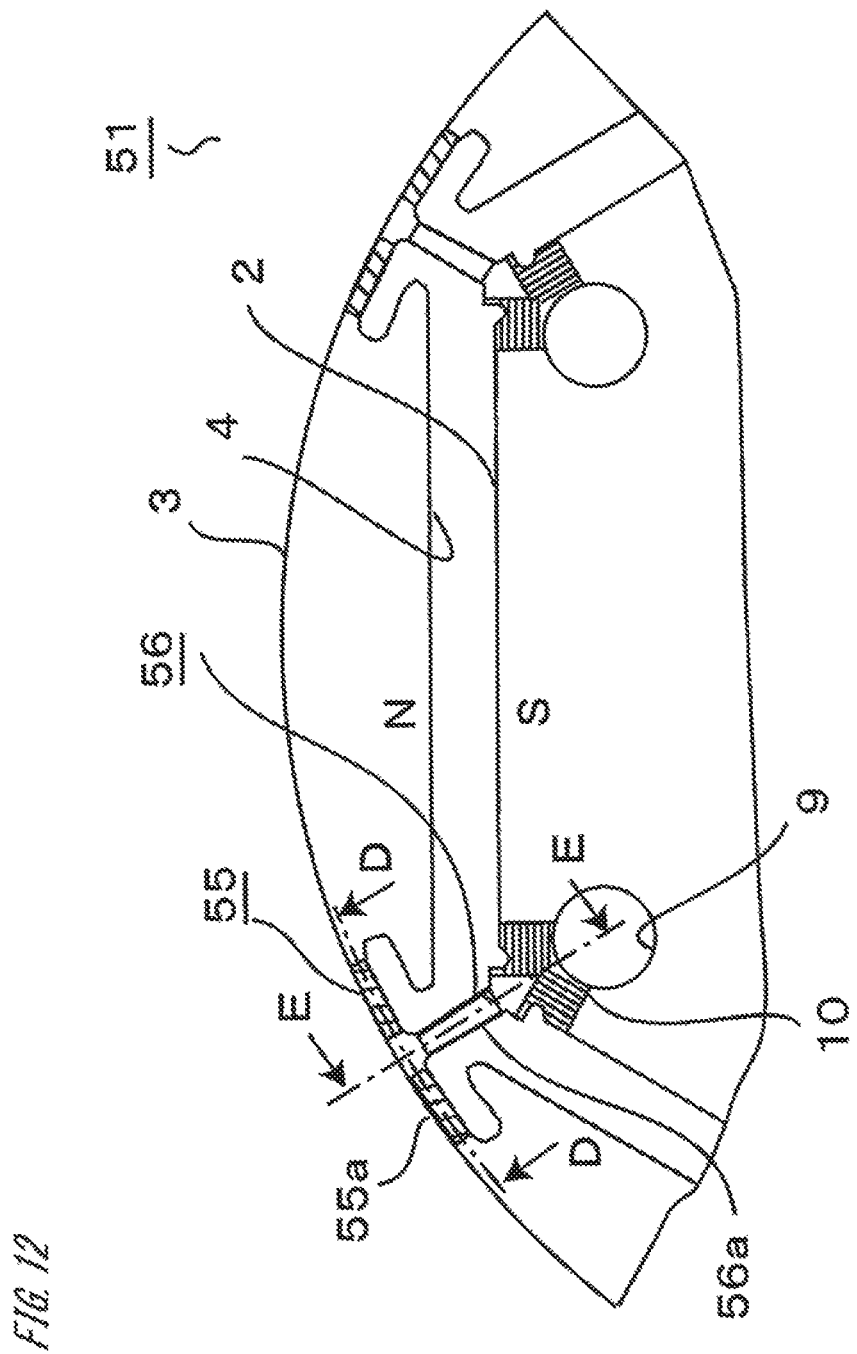
FIG. 12 is a plan view showing a major part of a steel sheet according to embodiment 5.
Figure 13:
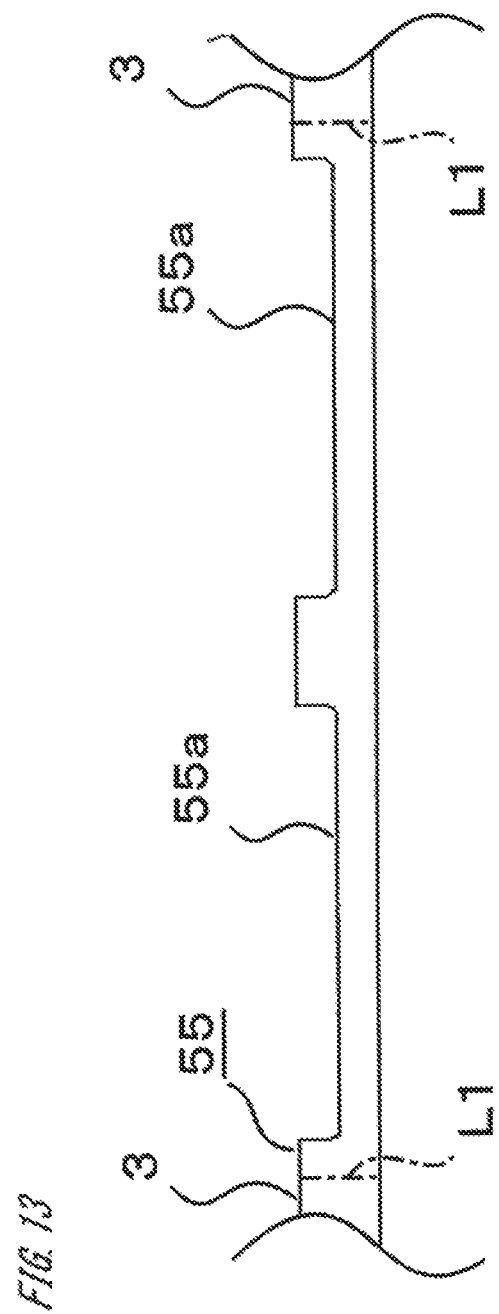
FIG. 13 is a sectional view of a circumferential-direction bridge portion of the steel sheet shown in FIG. 12, as seen from D-D arrow direction.
Figure 14:
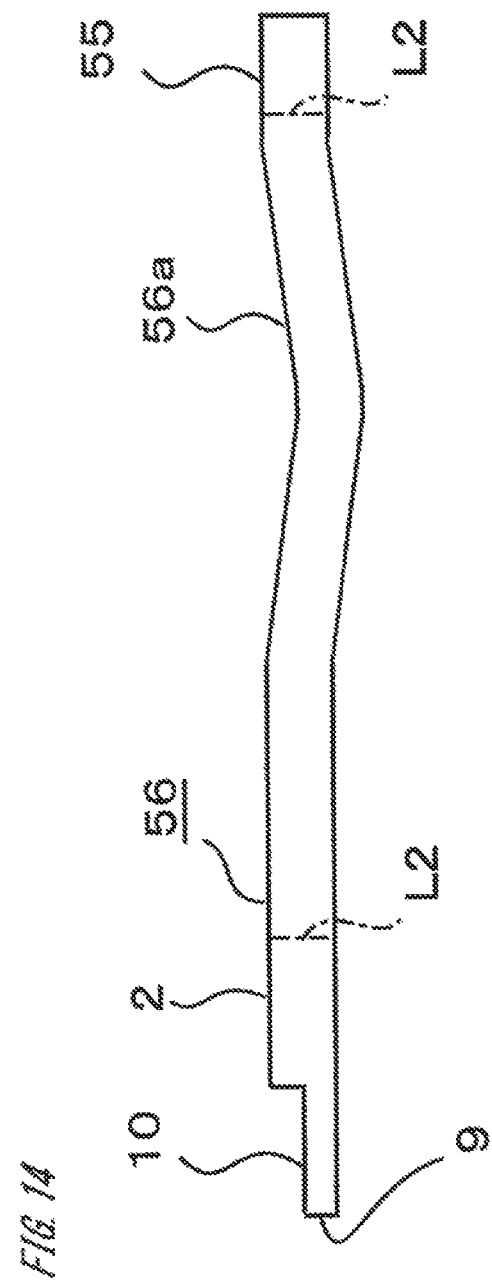
FIG. 14 is a sectional view of a radial-direction bridge portion of the steel sheet shown in FIG. 12, as seen from E-E arrow direction.

FIG. 12 to FIG. 14 show embodiment 5. FIG. 12 is a plan view showing a major part of a steel sheet. FIG. 13 is a sectional view of a circumferential-direction bridge portion of the steel sheet shown in FIG. 12, as seen from D-D arrow direction. FIG. 14 is a sectional view of a radial-direction bridge portion of the steel sheet shown in FIG. 12, as seen from E-E arrow direction. In these drawings, a steel sheet 51 has: vent holes 9; coined portions 10 (shown by hatching) as thinned portions; circumferential-direction bridge portions 55 as bridges for which a coining work has been performed; and radial-direction bridge portions 56 as bridges for which a bending work has been performed. Each vent hole 9 having a round shape is formed on the inner side of the radial-direction bridge portion 56, between the magnet insertion holes 4. Each coined portion 10 is recessed in a rectangular sectional shape and connects the magnet insertion hole 4 and the vent hole 9. As shown in FIG. 13, each circumferential-direction bridge portion 55 has a coined portion 55a (shown by hatching in FIG. 12) which is recessed downward from the upper level and of which the bottom has a flat-plate shape and the thickness in the sheet-thickness direction is decreased. A coining work is not performed on the radial-direction bridge portions 56, and as shown in FIG. 14, each radial-direction bridge portion 56 has a bent portion 56a. The bent portion 56a is bent so as to have a V-shaped sectional shape protruding downward in the sheet-thickness direction. The other configuration is the same as that in embodiment 1 shown in FIG. 2. Therefore, the corresponding parts are denoted by the same reference characters and the description thereof is omitted.

In the configuration as described above, if the bent portion 56a is first formed in the radial-direction bridge portion 56, the bent portion 56a absorbs deformation of the radial-direction bridge portion 56 which is deformed outward in the radial direction by being pushed by deformation of the coined portion 10 during working of the coined portion 10. Thus, deformation of the steel sheet 51 due to working of the coined portion 10 can be suppressed. On the other hand, if the coined portion 10 is formed first, deformation of the radial-direction bridge portion 56 caused by being pushed by deformation of the coined portion 10 is corrected through formation of the bent portion 56a, whereby dimensional accuracy of the steel sheet 51 can be ensured. As a matter of course, the coined portion 10 and the bent portion 56a may be formed at the same time. When such steel sheets 51 are stacked, a passage, e.g., a cooling medium passage, is formed from the vent hole 9 via the coined portion 10 (which is recessed) to the magnet insertion hole 4, and further, from the magnet insertion hole 4 via the coined portion 55a to the outer surrounding space of the steel sheet 1. As a result, it becomes possible to suck a cooling medium from an end part of the steel sheet 1 toward each magnet insertion hole 4. Thus, it becomes possible to cool the permanent magnets by a cooling medium flowing through the cooling medium passages during rotation of the rotor.

By forming the rotor using the steel sheets 51 as described above, it becomes possible to obtain a rotor having high accuracy and a rotor for rotary electric machine having high characteristics in which the amount of magnetic flux is increased by cooling of the permanent magnets and magnetic short-circuit at the circumferential-direction bridge portion 55 is suppressed, whereby the effect of increasing the amount of effective magnetic flux is maximized.

In the present embodiment, the case where the coined portion 55a of the circumferential-direction bridge portion 55 has such a sectional shape that the bottom thereof is flat, has been shown as an example. In this case, it is assumed that dimensional deformation due to coining works at a plurality of locations can be suppressed by only shaping of each radial-direction bridge portion 56 in the sheet-thickness direction, for example. However, regarding the shaping of the circumferential-direction bridge portion 55 in the sheet-thickness direction, the shape thereof and the number of shaping locations may be adjusted in accordance with the effect. Alternatively, in the case of prioritizing durability of the circumferential-direction bridge portion 55 against stress caused by a centrifugal force due to rotation of the rotor, the above configuration is desirable in order to prevent resistance to the stress from being reduced by the coined portion 55a of the circumferential-direction bridge portion 55 being bent in a V shape or an arc shape in the sheet-thickness direction, for example.

In general, stress on the radial-direction bridge portion 56 caused by a centrifugal force during rotation is smaller than that on the circumferential-direction bridge portion 55, and therefore the radial-direction bridge portion 56 has some margin in mechanical strength as compared to the circumferential-direction bridge portion 55. Therefore, if a coined portion or a bent portion is formed in either the circumferential-direction bridge portion 55 or the radial-direction bridge portion 56, it is desirable that a coined portion or a bent portion is preferentially formed in the radial-direction bridge portion 56 having some margin in mechanical strength. It is noted that, as necessary, a coining work may be performed on the bent portion 56a to increase the cooling medium passage, or without limitation to the coined portion 55a, a coined portion may be formed at another position of the peripheral part on the outer circumferential side of the steel sheet 51 and may be used as a cooling medium passage.

Embodiment 6

Figure 15:
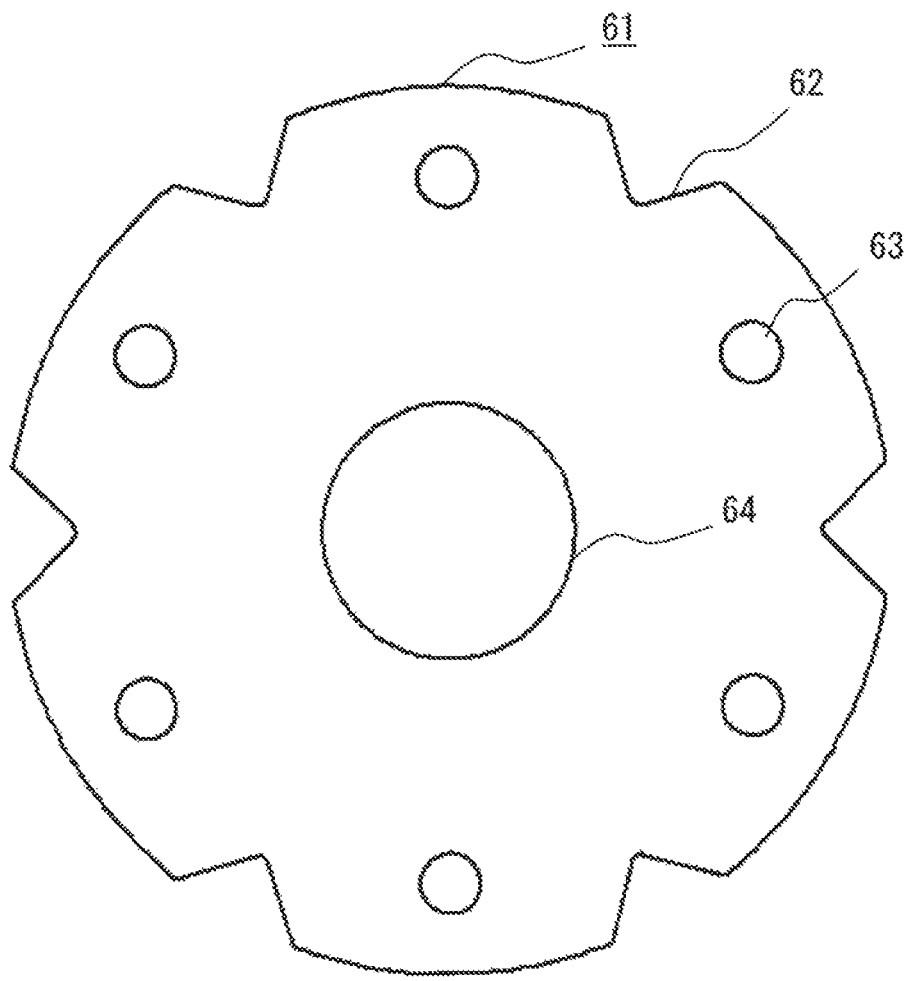
FIG. 15 is a plan view showing an entire end plate according to embodiment 6.
Figure 16:
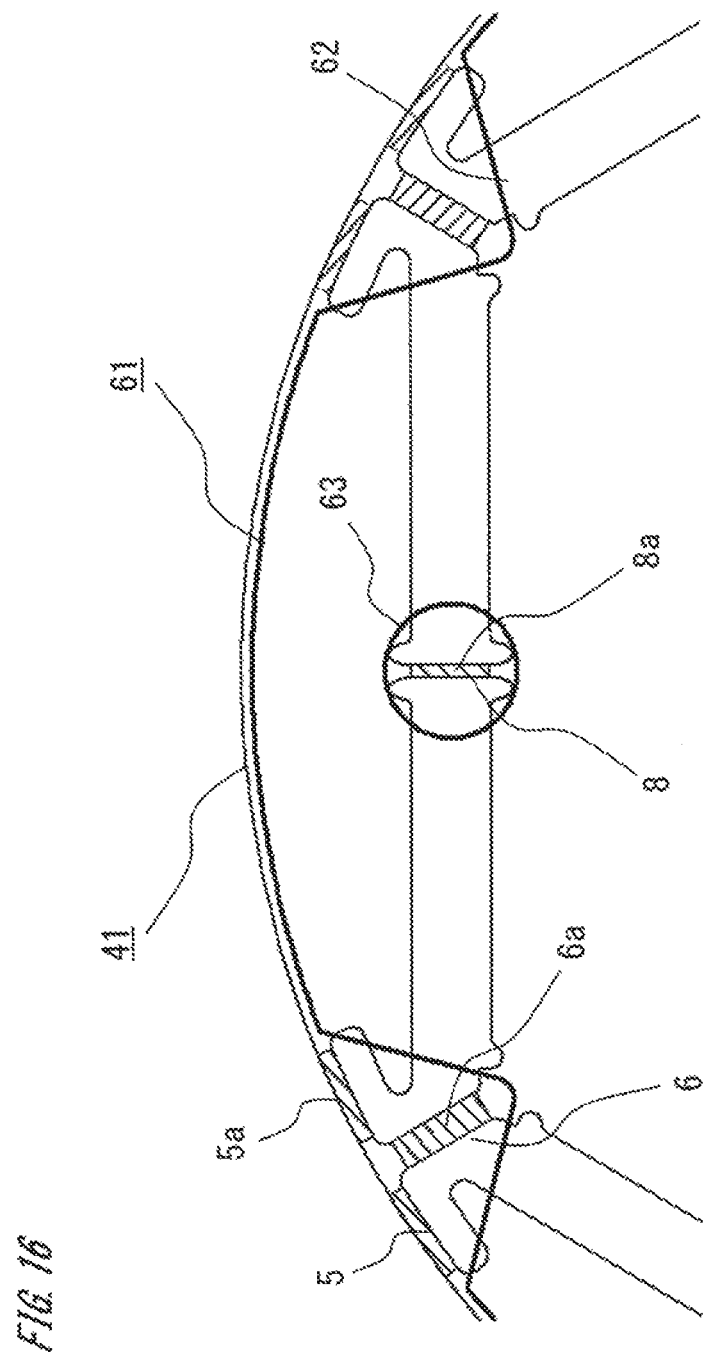
FIG. 16 is a plan view showing a major part of combination of the end plate and steel sheets according to embodiment 6.

FIG. 15 and FIG. 16 show embodiment 6. FIG. 15 is a plan view showing an entire end plate. FIG. 16 is a plan view showing a major part of the end plate and the steel sheet that are combined. In this case, the steel sheet 41 (see FIG. 10, FIG. 11) according to the above embodiment 4 is used. Each of end plates 61 provided at both ends in the axial direction of the core formed by stacking the steel sheets 41 has cutouts 62 at the outer circumference thereof, has holes 63 at positions corresponding to the center bridge portions 8, and has a shaft insertion hole 64 at the center. The cutouts 62 of each end plate 61 are formed at the outer circumferential positions corresponding to the regions where the circumferential-direction bridge portions 5 and the radial-direction bridge portions 6 are present.

It is noted that structures for integrating the end plates 61 and the stacked steel sheet 41, e.g., rivets and rivet insertion holes, are not shown in the drawings.

The steel sheet 41 has the circumferential-direction bridge portions 5, the radial-direction bridge portions 6, and the center bridge portions 8 as described above, and these bridge portions 5, 6, 8 have such shapes that the protruding bent portions (protrusions) 5a, 6a, 8a protrude toward the end plate 61. In the present embodiment, owing to the cutouts 62 at the outer circumference of the end plate 61, the bent portions 5a, 6a can be prevented from interfering with the end plate 61, and owing to the holes 63 of the end plate 61, the bent portions 8a can be prevented from interfering with the end plate 61.

Thus, positional accuracy of the magnets in the axial direction is prevented from being deteriorated by deformation of the end plate 61, and the magnets can be prevented from protruding from the stacked core. Thus, it is possible to obtain a small-sized rotor that can be easily assembled and has no recesses and no protrusions. In addition, when the magnets are magnetized after the rotor is assembled, excellent magnetization characteristics are obtained, whereby performance of the rotor can be also improved.

It is noted that the thickness of the end plate 61 is greater than the amount of protrusion of the bent portions 5a, 6a, 8a.

The shapes of the cutouts 62 and the holes 63 are not limited to those shown in FIG. 15 and FIG. 16, but may be any shapes that prevent interference between the bent portions 5a, 6a, 8a and the end plate 61.

In the above embodiment 6, the end plate 61 having both of the cutouts 62 and the holes 63 has been shown. However, the end plate 61 may have either the cutouts 62 or the holes 63. In addition, the end plate having at least either the cutouts 62 or the holes 63 may be applied to the stacked core using the steel sheets 1, 21, or 51 shown in the above embodiment 1, 2, or 5.

In the above embodiments, the locations of the bridge portions are not limited to those shown in the embodiments, and the positions and the number thereof at which a coining work is performed are not limited to those shown above. Similarly, two types of protrusion shapes of an arc shape and a V shape are shown as the bending shape of each bridge portion in the sheet-thickness direction, but the same effects are provided even by other shapes, e.g., a V shape having a flat part at the bottom surface, a W shape with V shapes connected, or a wave shape, as long as the shapes have recesses/protrusions in the sheet-thickness direction. In addition, the case where the depth of the coining work is about half the sheet thickness has been shown as an example, but without limitation thereto, the depth may be set in consideration of balance among the effect of reduction in short-circuited magnetic flux, mechanical strength, and press (coining) work performance.

In addition, as the shape of the steel sheet (core), the case where the number of magnetic poles is six has been shown as an example, but another number of magnetic poles, e.g., four poles or eight poles, may be employed. In addition, the case where the outer shape of the steel sheet 1 is a round shape has been shown as an example, but the same effects are provided even by other shapes, e.g., a shape having comparatively large recesses/protrusions in the radial direction like a petal shape or the like (shapes that are macroscopically considered to be round). In addition, as the shape of the magnet insertion hole of the steel sheet, the case where one or a plurality of plate-shaped magnets are arranged on one straight line has been shown as an example, but other arrangements, e.g., V-shape arrangement around the rotation axis or U-shape arrangement, may be used. In addition, it is desirable that the used magnets are rare earth sintered magnets or rare earth bonded magnets, which have great magnetic forces, but other magnets such as ferrite sintered magnets may be used. Further, in the above embodiments, a rotary electric machine provided to a compressor is assumed, but as a matter of course, any rotary electric machines used for other purposes are also applicable as long as the rotary electric machines have such a configuration that the magnets are inserted in the steel sheets of the rotor.

The rotary electric machine having the rotor having high dimensional accuracy according to each embodiment as described above has high performance.

It is noted that, within the scope of the present invention, the above embodiments may be freely combined with each other, or each of the above embodiments may be modified or simplified as appropriate.

The invention claimed is:

1. A rotor for rotary electric machine of an embedded-magnet type in which a magnet is included inside a stacked core formed by stacking a plurality of stacked steel sheets, each steel sheet comprising:
    a radially-outer-side steel sheet positioned on a radially outer side of the magnet;
    a radially-inner-side steel sheet positioned on a radially inner side of the magnet; and
    radial-direction bridges connecting the radially-outer-side steel sheet and the radially-inner-side steel sheet,
    circumferential-direction bridges formed on the peripheral part of the radially-outer-side steel sheet, wherein
    a coined portion shaped to decrease a sheet thickness thereof is formed at a part of each steel sheet,
    the coined portion, includes a first coined portion formed on at least a part of the radial-direction bridges and the circumferential-direction bridges except at connection parts connecting the radial-direction bridges and the circumferential-direction bridges, and
    a bent portion shaped so as to protrude in an axial direction of the rotor is formed on at least a part of the radial-direction bridges and the circumferential-direction bridges except at connection parts connecting the radial-direction bridges and the circumferential-direction bridges.

2. The rotor for rotary electric machine according to claim 1, wherein
    the bent portion is located at the first coined portion.

3. The rotor for rotary electric machine according to claim 2, wherein
    the bent portion is formed so as not to protrude from upper level and lower level of a part of the steel sheet except at the first coined portion, in a sheet-thickness direction of each steel sheet.

4. The rotor for rotary electric machine according to claim 3, wherein
    the radially-inner-side steel sheet has a vent hole penetrating therethrough in a sheet-thickness direction,
    the coined portion includes a second coined portion formed on an outer circumferential side with respect to the vent hole,
    the coined portion includes a third coined portion formed on at least one of the radially-outer-side steel sheet and the circumferential-direction bridges, and
    a cooling medium passage is formed which leads from the vent hole via the second and third coined portions to the space on the outer circumferential side of the steel sheet.

5. A rotary electric machine comprising the rotor for rotary electric machine according to claim 4.

6. A rotary electric machine comprising the rotor for rotary electric machine according to claim 3.

7. The rotor for rotary electric machine according to claim 2, wherein
    the radially-inner-side steel sheet has a vent hole penetrating therethrough in a sheet-thickness direction,
    the coined portion includes, a second coined portion formed on an outer circumferential side with respect to the vent hole,
    the coined portion includes a third coined portion formed on at least one of the radially-outer-side steel sheet and the circumferential-direction bridges, and
    a cooling medium passage is formed which leads from the vent hole via the second and third coined portions to the space on the outer circumferential side of the steel sheet.

8. The rotor for rotary electric machine according to claim 7, further comprising end plates provided at both ends in the axial direction of the stacked core and holding the magnet, wherein
    each end plate has at least one of a cutout and a hole in a region corresponding to protrusion of the bent portion.

9. A rotary electric machine comprising the rotor for rotary electric machine according to claim 7.

10. The rotor for rotary electric machine according to claim 2, further comprising end plates provided at both ends in the axial direction of the stacked core and holding the magnet, wherein
    each end plate has at least one of a cutout and a hole in a region corresponding to protrusion of the bent portion.

11. A rotary electric machine comprising the rotor for rotary electric machine according to claim 10.

12. A rotary electric machine comprising the rotor for rotary electric machine according to claim 2.

13. The rotor for rotary electric machine according to claim 1, wherein
    the radially-inner-side steel sheet has a vent hole penetrating therethrough in a sheet-thickness direction,
    the coined portion includes, a second coined portion formed on an outer circumferential side with respect to the vent hole,
    the coined portion includes a third coined portion formed on at least one of the radially-outer-side steel sheet and the circumferential-direction bridges, and
    a cooling medium passage is formed which leads from the vent hole via the second and third coined portions to the space on the outer circumferential side of the stacked steel sheets.

14. The rotor for rotary electric machine according to claim 13, further comprising end plates provided at both ends in the axial direction of the stacked core and holding the magnet, wherein
    each end plate has at least one of a cutout and a hole in a region corresponding to protrusion of the bent portion.

15. A rotary electric machine comprising the rotor for rotary electric machine according to claim 13.

16. The rotor for rotary electric machine according to claim 1, further comprising end plates provided at both ends in the axial direction of the stacked core and holding the magnet, wherein
    each end plate has at least one of a cutout and a hole in a region corresponding to protrusion of the bent portion.

17. A rotary electric machine comprising the rotor for rotary electric machine according to claim 16.

18. A rotary electric machine comprising the rotor for rotary electric machine according to claim 1.

19. The rotor for rotary electric machine according to claim 1, wherein
the bent portion is located on at least a part of the radial-direction bridges and the circumferential-direction bridges except connection parts connecting the radial-direction bridges and the circumferential-direction bridges, and
the bent portion is located except the first coined portion.

20. A method for manufacturing a rotor for rotary electric machine according to claim 1, wherein
the method comprising:
a coining work step for forming the coining portions shaped to decrease a sheet thickness thereof,
a shaping step for forming the bent portions shaped so as to protrude in an axial direction of the rotor, on at least a part of the radial-direction bridges and the circumferential-direction bridges except connection parts connecting the radial-direction bridges and the circumferential-direction bridges.

* * * * *